US010027253B2

(12) United States Patent
Jasim

(10) Patent No.: US 10,027,253 B2
(45) Date of Patent: Jul. 17, 2018

(54) VOLTAGE SOURCE CONVERTER

(71) Applicant: General Electric Technology GmbH, Baden (CH)

(72) Inventor: Omar Fadhel Jasim, Wollaton (GB)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 0 days.

(21) Appl. No.: 15/251,491

(22) PCT Filed: Mar. 3, 2015

(86) PCT No.: PCT/EP2015/054425
§ 371 (c)(1),
(2) Date: Aug. 30, 2016

(87) PCT Pub. No.: WO2015/132262
PCT Pub. Date: Sep. 11, 2015

(65) Prior Publication Data
US 2017/0063255 A1    Mar. 2, 2017

(30) Foreign Application Priority Data
Mar. 4, 2014    (EP) .................................... 14275041

(51) Int. Cl.
*H02J 3/36* (2006.01)
*H02M 7/757* (2006.01)
(Continued)

(52) U.S. Cl.
CPC ......... *H02M 7/7575* (2013.01); *H02M 7/217* (2013.01); *H02M 7/219* (2013.01);
(Continued)

(58) Field of Classification Search
CPC ........ H02M 5/40; H02M 5/42; H02M 7/7575; H02M 5/458; H02M 5/45; H02M 5/4585;
(Continued)

(56) References Cited

U.S. PATENT DOCUMENTS 5,656,924 A    8/1997 Mohan et al.
5,889,663 A *  3/1999 Tabata ................ H02M 3/1584
                                                     363/56.03
(Continued)

FOREIGN PATENT DOCUMENTS

WO    2008000626 A1    1/2008
WO    2009016340 A1    2/2009
WO    2013105427 A1    7/2013

OTHER PUBLICATIONS

International Search Report and Written Opinion issued in connection with corresponding PCT application PCT/EP2015/054425 dated May 22, 2015.
(Continued)

*Primary Examiner* — Nguyen Tran
(74) *Attorney, Agent, or Firm* — GE Global Patent Operation; Scott R. Stanley

(57) ABSTRACT

In the field of high voltage direct current power transmission networks, a voltage source converter comprises first and second DC terminals for connection to a DC electrical network, and a plurality of single-phase limbs. Each single-phase limb includes a phase element, and each phase element includes at least one switching element configured to interconnect a DC voltage and an AC voltage. An AC side of each phase element is connectable to a respective phase of a multi-phase AC electrical network, and each single-phase limb is connected between the first and second DC terminals. The voltage source converter further comprises a controller configured to determine independently of one another an amount of active power ($P_{ref}$) that the voltage source converter should exchange with the AC electrical network and an amount of reactive power ($Q_{ref}$) that the voltage source converter should exchange with the AC electrical network.

17 Claims, 4 Drawing Sheets

(51) Int. Cl.
*H02M 7/217* (2006.01)
*H02M 7/219* (2006.01)
*H02M 1/42* (2007.01)

(52) U.S. Cl.
CPC ............ *H02M 1/42* (2013.01); *H02M 1/4208* (2013.01); *H02M 7/757* (2013.01); *Y02B 70/12* (2013.01); *Y02B 70/126* (2013.01)

(58) Field of Classification Search
CPC .... H02M 5/4505; H02M 5/451; H02M 5/452; H02H 7/261; H02H 7/268; H02J 3/36
USPC .......................................... 363/34–37, 40–41
See application file for complete search history.

(56) References Cited

U.S. PATENT DOCUMENTS

| | | | |
|---|---|---|---|
| 6,856,040 B2* | 2/2005 | Feddersen | F03D 7/0224 290/44 |
| 2007/0223261 A1 | 9/2007 | Fujii et al. | |
| 2012/0212191 A1 | 8/2012 | Yuzurihara et al. | |
| 2013/0010505 A1* | 1/2013 | Bo | H02J 3/386 363/37 |
| 2014/0015250 A1 | 1/2014 | Teodorescu et al. | |
| 2015/0333642 A1* | 11/2015 | Son | H02M 5/44 363/35 |

OTHER PUBLICATIONS

G. Balaji et al. "Power Converter Topology for Permanent Magnet Wind Generator System" IOSR Journal of Engineering, vol. 03, No. 02, p. 43-51, Feb. 2013.

Evgenije Adzic et al. "PLL synchronization in grid connected Converters", the 6th PSU-UNS International Conference on Engineering and Technology, p. 1-5, May 17, 2013.

Antonio Camacho et al. "Reactive Power Control for Distributed Generation Power Plants to Comply With Voltage Limits During Grid Fau Its", p. 1-10, Jan. 20, 2014.

European Search Report issued in connection with corresponding EP Application No. 14275041.3 dated Aug. 22, 2014.

WO Preliminary Written Opinion issued in connection with corresponding WIPO Application No. PCT/EP2015/054425 dated Feb. 23, 2016.

WO International Search Report & Written Opinion issued in connection with corresponding WIPO Application No. PCT/EP2015/054425 dated Jun. 28, 2016.

European Office Action issued in connection with corresponding EP Application No. 14275041.3 dated May 17, 2017.

Unofficial English Translation of Chinese Office Action issued in connection with corresponding CN Application No. 201580012050.4 dated Jan. 11, 2018.

* cited by examiner

VOLTAGE SOURCE CONVERTER

BACKGROUND

The present disclosure relates to a voltage source converter.

In power transmission networks, alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion between AC power and DC power is also utilized in power transmission networks where it is necessary to interconnect AC electrical networks operating at different frequencies. In any such power transmission network, converters are required at each interface between AC and DC power to carry out the required conversion, and one such form of converter is a voltage source converter (VSC).

BRIEF DESCRIPTION

According to an aspect of the invention, a voltage source converter provided including first and second DC terminals for connection to a DC electrical network, and a plurality of single-phase limbs. Each single-phase limb includes a phase element, and each phase element includes at least one switching element configured to interconnect a DC voltage and an AC voltage. An AC side of each phase element is connectable to a respective phase of a multi-phase AC electrical network, and each single-phase limb is connected between the first and second DC terminals. The voltage source converter further includes a controller configured to determine independently of one another an amount of active power that the voltage source converter should exchange with the AC electrical network and an amount of reactive power that the voltage source converter should exchange with the AC electrical network, the controller being further configured to establish a respective phase current reference for each single-phase limb which is independent of the or each other respective phase current reference and which defines the current each single-phase limb is required to draw from or pass to a corresponding phase of the AC electrical network to effect the determined active power and reactive power exchanges with the AC electrical network.

The ability to determine independently of one another amounts of active and reactive power that the voltage source converter should exchange with the AC electrical network, and the ability to control and alter these amounts, permits an optimum amount of energy to be transferred between the AC and DC electrical networks irrespective of the conditions under which the voltage source converter is operating, e.g. normal conditions in which the currents flowing in the single-phase limbs are essentially balanced, and fault conditions in which the currents flowing in the single-phase limbs are unbalanced.

Such functionality is particularly useful when the AC electrical network with which the voltage source converter is connected is weak, i.e. the AC electrical network has a high impedance and/or it has low inertia.

A typical high impedance AC electrical network arises within a High Voltage Direct Current (HVDC) link which terminates at a weak point that has a low short-circuit capacity. A low inertia AC electrical network is considered to have a limited number of rotating machines or no rotating machines at all. Both such weak AC electrical networks are often found in a HVDC link that is powering an island or is connected to a wind farm.

In an embodiment, the controller includes a first control block which has an active power control block to determine the amount of active power to be exchanged with the AC electrical network and a reactive power control block to determine the amount of reactive power to be exchanged with the AC electrical network.

The inclusion of separate active power and reactive power control blocks facilitates the independent determination of active power and reactive power amounts.

In an embodiment, the active power control block includes a power control section which outputs the amount of active power to be exchanged, the power control section including a selectively operable DC voltage control portion and a selectively operable DC power control portion, the DC voltage control portion operating when the voltage source converter is configured to transfer energy from the AC electrical network to the DC electrical network and the DC power control operating when the voltage source converter is configured to transfer energy from the DC electrical network to the AC electrical network.

Such an arrangement permits ready determination of the amount of active power the voltage source converter should exchange with the AC electrical network when the voltage source converter is configured to operate as a rectifier, i.e. transfer energy from the AC electrical network to the DC electrical network, and when configured to operate as an inverter, i.e. to transfer energy from the DC electrical network to the AC electrical network.

In an embodiment of the invention, the active power control block further includes a fault detection section configured to modify the output of the power control section in the event of the currents flowing in the single-phase limbs becoming unbalanced in order to alter the amount of active power that the voltage source converter exchanges with the AC electrical network.

The inclusion of such a fault detection section assists in allowing the voltage source converter to continue operating through disturbances, i.e. fault conditions in which the currents flowing in the single-phase limbs are unbalanced, while permitting where possible a maximum amount of energy to be transferred between the AC and DC electrical networks during such disturbances.

The fault detection section may include a voltage level fault detector configured to detect a reduction in the AC voltage of the AC electrical network and thereafter temporarily reduce the amount of active power that the voltage source converter exchanges with the AC electrical network.

Such a voltage level fault detector provides a degree of protection to the voltage source converter because reducing the active power that the voltage source converter exchanges with the AC electrical network helps to ensure that none of the currents flowing in the single-phase limbs exceeds the rated current value that the particular single-phase limb was designed to accommodate.

In an embodiment, the fault detection section includes a single phase fault detector configured to detect a fault to ground in a single phase of the AC electrical network and thereafter temporarily reduce the amount of active power that the voltage source converter exchanges with the AC electrical network.

The inclusion of such a single phase fault detector helps to permit the voltage source converter to continue operating and transferring energy between the AC and DC electrical networks in the event of such a single phase fault to ground.

In an embodiment, the fault detection section includes a multi-phase fault detector configured to detect a fault to ground in each phase of the AC electrical network and thereafter temporarily reduce to zero the amount of active power that the voltage source converter exchanges with the AC electrical network.

Such a fault detector helps to prevent the voltage source converter having to conduct too high a current in one or more of its single-phase limbs which might otherwise damage the or each said single-phase limb.

In another embodiment of the invention, the fault detection section includes a manipulation module operable at a first time constant and a second time constant, the manipulation module altering the operation of the fault detection section whereby any reduction in the amount of active power that the voltage source converter exchanges with the AC electrical network takes place at the first time constant and any subsequent increase in the amount of active power that the voltage source converter exchanges with the AC electrical network takes place at the second time constant.

In an embodiment, the first and second time constants differ from one another.

The provision of a manipulation module having the foregoing features allows for a degree of control to be exercised over the rate at which the amount of active power is determined. For example, it may be desirable for action to be taken quickly by way of a short first time constant to reduce the amount of active power the voltage source converter exchanges with the AC electrical network, e.g. during unbalanced fault conditions, while the amount of active power exchanged can be increased, e.g. to a normal operating level, more slowly by way of a long second time constant so that voltage source converter is more readily able to reach a steady-state operating condition.

In an embodiment, the reactive power control block includes a selectively operable AC voltage control portion and a selectively operable fault control portion, the AC voltage control portion operating when the currents flowing in the single-phase limbs are balanced, and the fault control portion operating when the currents flowing in the single-phase limbs are unbalanced.

Such a reactive power control block permits ready determination of the amount of reactive power the voltage source converter should exchange with the AC electrical network during normal, i.e. balanced, operating conditions and fault, i.e. unbalanced, operating conditions.

The controller may include a second control block which has a current reference generator that establishes the respective phase current reference for each single-phase limb based on the amounts of active and reactive power determined by the first control block.

An arrangement of this type readily allows the phase current references to be established by the current reference generator to take into account the amounts of active and reactive power it is determined as being desirable to exchange with the AC electrical network.

In a further embodiment of the invention, the current reference generator further establishes the respective phase current reference for each single-phase limb based on positive and negative voltage sequence components within a stationary α-β reference frame, the positive and negative voltage sequence components being derived from the actual phase voltage of each phase of the AC electrical network.

The utilisation of positive and negative voltage sequence components that are represented within a stationary α-β reference frame avoids the difficulty of otherwise having to synchronise the voltage source converter and the AC electrical network with one another, e.g. through the use of a difficult to implement and unreliable (at least in relation to weak AC electrical networks) Phase Locked Loop (PLL), or some form of time-consuming (and hence bandwidth reducing) rotational transformation such as representation within a synchronously rotating reference frame.

In an embodiment, the second control block also includes a transformation module configured to transform components within a stationary α-β reference frame to individual phase components.

The inclusion of a transformation module permits the current reference generator to also utilise positive and negative current sequence components within a stationary α-β reference frame that are derived from actual currents flowing in the single-phase limbs, and so thereby further avoid the difficulty of otherwise having to synchronise the voltage source converter and AC electrical network.

Optionally, the second control block also includes a current limiter module configured to limit the maximum value of each phase current reference the current reference generator is able to establish.

Such a current limiter module protects each single-phase limb and associated phase element from damage by too high a current.

The controller may include a third control block which has a plurality of phase controls, each of which corresponds to a respective phase of the AC electrical network, and each of which is configured to generate an AC voltage demand that the corresponding single-phase limb is required to provide in order that the current flowing in the corresponding single-phase limb tracks the established phase current reference.

The inclusion of a separate phase control for each phase of the AC electrical network further allows the current flowing in each single-phase limb to be controlled independently of one another and thereby facilitates the amounts of active and reactive power exchanged with the AC electrical network to be similarly independently controlled.

In an embodiment, the controller includes a positive and negative sequence generator to derive positive and negative voltage sequence components within a stationary α-β reference frame from the actual phase voltage of each phase of the AC electrical network.

The inclusion of such a generator ensures that such sequence components are readily available for use by respective control blocks within the controller.

BRIEF DESCRIPTION OF THE DRAWINGS

There now follows a brief description of embodiments of the invention, by way of non-limiting example, with reference being made to the following figures in which.

DETAILED DESCRIPTION

Figure 1:
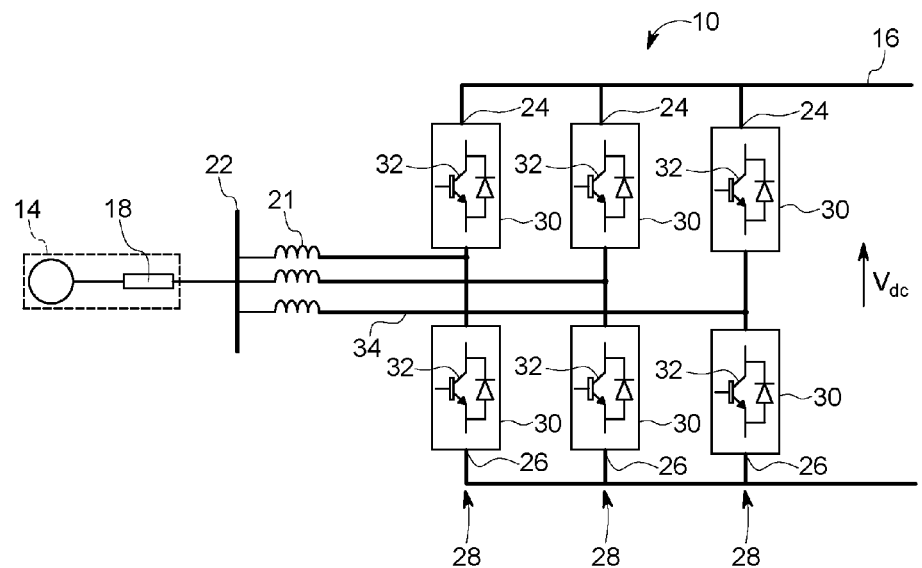
FIG. 1 shows a schematic view of a power transmission network including a voltage source converter according to a first embodiment of the invention lying between respective AC and DC electrical networks.

A voltage source converter according to a first embodiment of the invention is designated by reference numeral 10 and is shown in FIG. 1.

The voltage source converter 10 lies within a power transmission network 12, and more particularly interconnects respective AC and DC electrical networks 14, 16. In the embodiment shown the AC electrical network 14 is a three phase a, b, c network, although AC electrical networks with fewer than or more than three phases can also be accommodated by voltage source converters according to an embodiment of the invention. In addition, the AC electrical network is weak in the sense that it has a high equivalent impedance 18 (as shown in FIG. 2).

An AC electrical network 14 may also be considered weak if it has low inertia, i.e. if it is susceptible to frequency changes, e.g. if a generator is removed from within the network 14. Such a low inertia network typically arises if there are few generators connected in either a short line or a very long line.

In any such instance, the level of active, i.e. real, power that can be exchanged with a weak AC electrical network is reduced compared to the active power that can be exchanged with a strong AC electrical network 14, i.e. an AC electrical network 14 which has a much lower equivalent impedance and/or much higher inertia. The voltage source converter 10 is, nevertheless, operable with both a weak and a strong AC electrical network 14.

Figure 2:
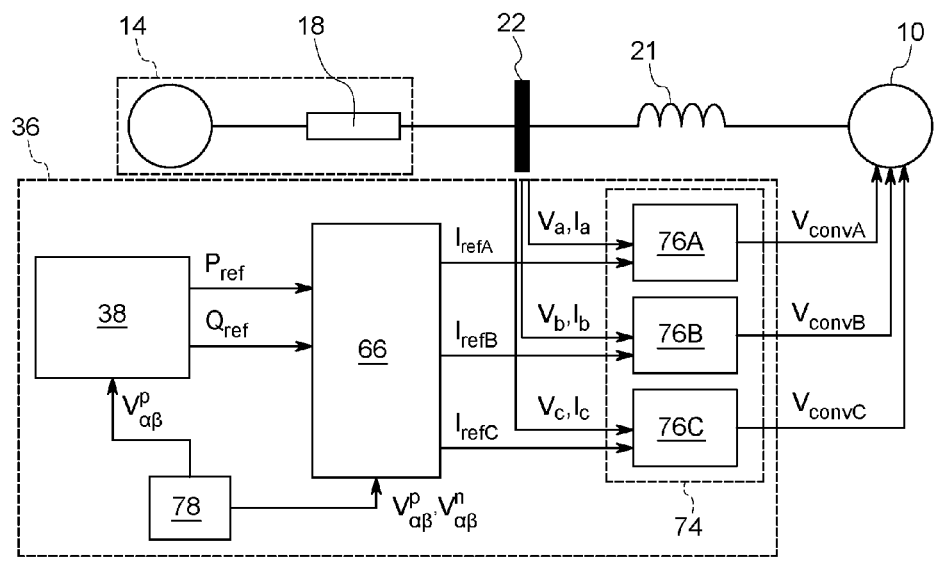
FIG. 2 shows a schematic view of an equivalent circuit corresponding to an AC side of the power transmission network shown in FIG. 1.

In the embodiment shown, the voltage source converter 10 is connected with the AC electrical network 14 by a transformer 20 which gives rise to a transformer impedance that is represented in the equivalent circuit shown in FIG. 2 by an inductor 21. The voltage source converter 10 need not always be connected with the AC electrical network 14 via a transformer 20. In any event the connection between the voltage source converter 10 and the AC electrical network 14 defines a point of common coupling (PCC) 22 there between.

The voltage source converter 10 itself includes first and second DC terminals 24, 26 which in use are connected to the DC electrical network 16. The voltage source converter 10 also includes three single-phase limbs 28. Each single-phase limb 28 includes a phase element 30 which, in the embodiment shown, includes a single switching element 32 that is configured to interconnect a DC voltage $V_{dc}$ of the DC electrical network 16 with an AC voltage of the AC electrical network 14. More particularly, an AC side 34 of each phase element 30 is in use connected to a respective phase a, b, c of the AC electrical network 14, via the transformer impedance, i.e. equivalent inductor 21, and each single-phase limb 28 is connected between the first and second DC terminals 24, 26. In other embodiments of the invention (not shown) one or more of the phase elements 30 may include more than one switching element 32, and in still further embodiments, one or more of the phase elements 30 may additionally include an energy storage device, e.g. in the form of a capacitor.

Figure 3:
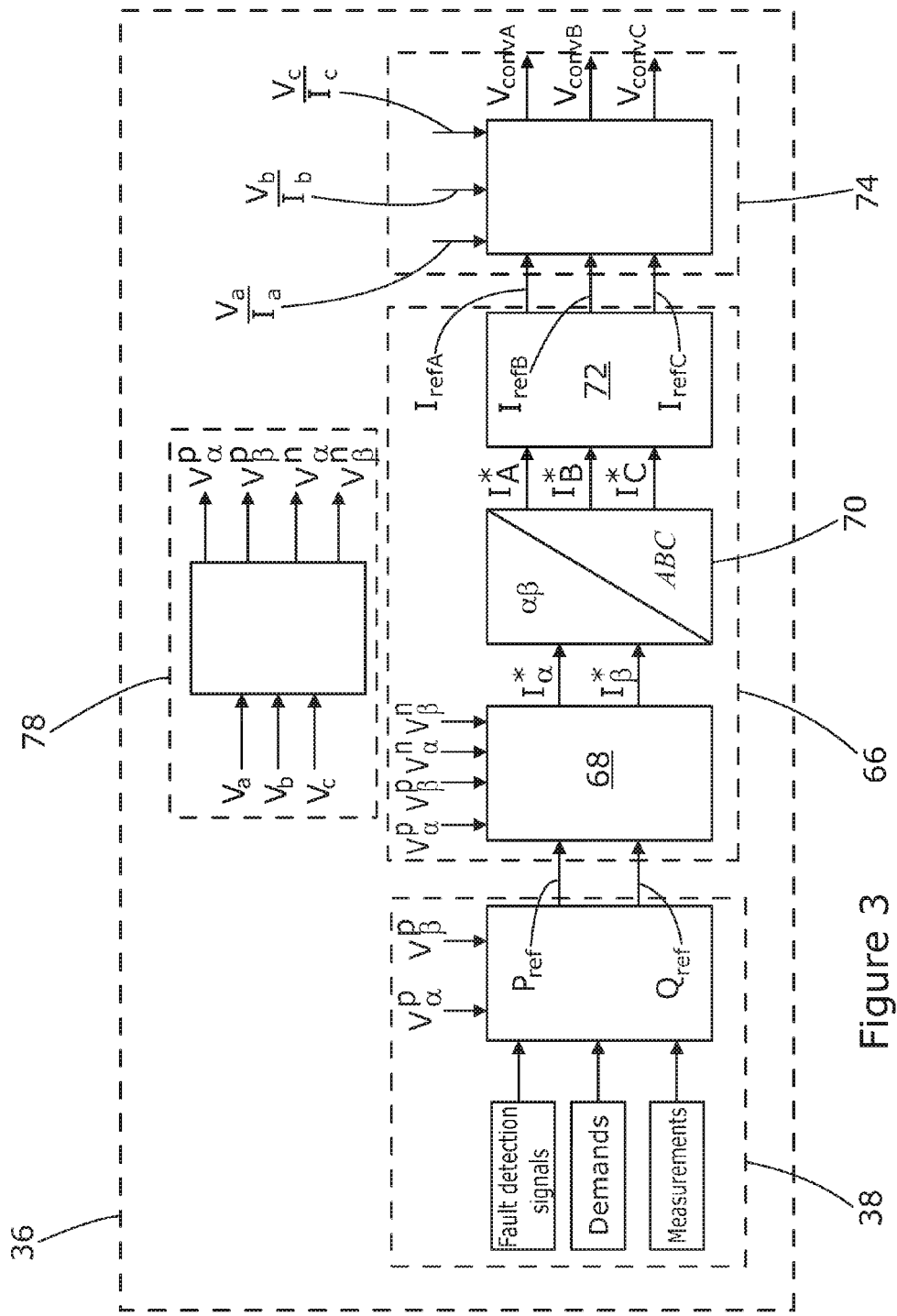
FIG. 3 shows a schematic view of a controller which forms part of the voltage source converter shown in FIG. 1.

The voltage source converter 10 also includes a controller 36, as shown schematically in FIG. 2 and in more detail in FIG. 3.

The controller 36 is configured to determine an amount of active power $P_{ref}$, i.e. real power, that the voltage source converter 10 should exchange with the AC electrical network 14. The controller 36 is also configured to determine, independently of the amount of active power $P_{ref}$ already mentioned, an amount of reactive power $Q_{ref}$ that the voltage source converter 10 should exchange with the AC electrical network 14.

In addition, the controller 36 is further configured to establish a respective phase current reference $I_{refA}$, $I_{refB}$, $I_{refC}$ for each single-phase limb 28 which is independent of the or each other respective phase current reference $I_{refA}$, $I_{refB}$, $I_{refC}$ and which defines the current that each single-phase limb 28 is required to draw from or pass to a corresponding phase a, b, c of the AC electrical network 14 in order to effect the determined active power $P_{ref}$ and reactive power $Q_{ref}$ exchanges with the AC electrical network 14.

Further details of the structure of the controller 36, the manner in which the amounts of active power $P_{ref}$ and reactive power $Q_{ref}$ are independently determined, and how respective phase current references $I_{refA}$, $I_{refB}$, $I_{refC}$ are established, are provided herein below.

Figure 4:
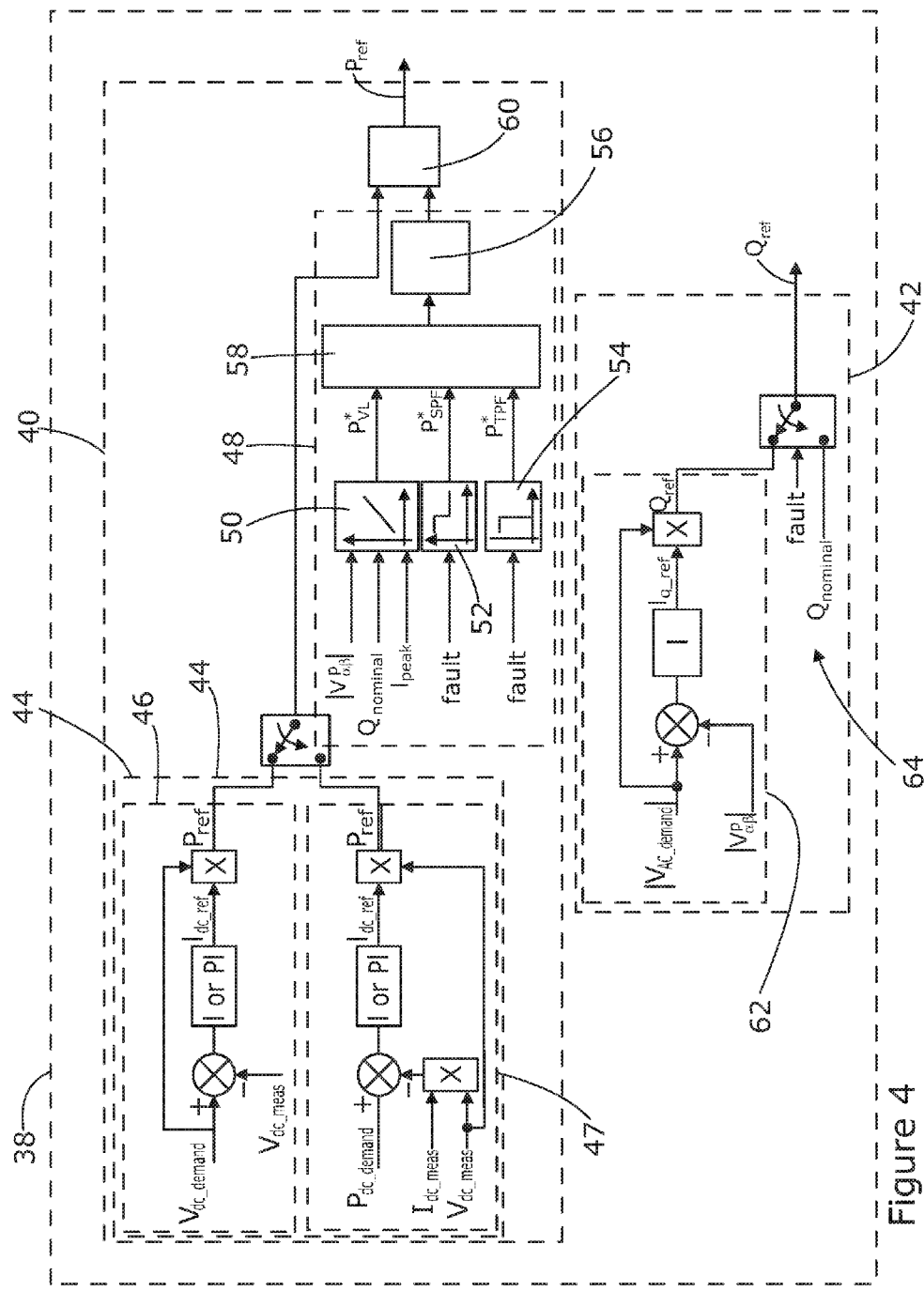
FIG. 4 shows a schematic view of a first control block which forms part of the controller shown in FIG. 3.

As illustrated most clearly in FIG. 4, the controller 36 includes a first control block 38 which has an active power control block 40 and a reactive power control block 42. In use the active power control block 40 determines the amount of active power $P_{ref}$ to be exchanged with the AC electrical network 14, while the reactive power control block 42 determines the amount of reactive power $Q_{ref}$ to be exchanged with the AC electrical network 14 depending on the status of the AC electrical network 14, i.e. whether the respective voltage in each phase a, b, c, of the AC electrical network 14 i.e. the respective phase voltages $V_a$, $V_b$, $V_c$, are balanced (e.g. during normal operating conditions) or unbalanced (e.g. during abnormal, i.e. fault, operating conditions).

The active power control block 40 includes a power control section 44, which outputs the said amount of active power $P_{ref}$ to be exchanged, and which includes a selectively operable DC voltage control portion 46 and a selectively operable DC power control portion 48. Each of the DC voltage control portion 46 and the selectively operable DC power control portion 48 includes a controller in the form of an Integral controller. Other types of controller are also possible such as a Proportional+Integral Controller, a Proportional+Integral+Derivative controller, and a Proportional+Integral+Derivative controller with low pass filter.

The DC voltage control portion 46 outputs an amount of active power $P_{ref}$ to be exchanged based on a DC voltage demand $V_{dc\_demand}$, i.e. a DC voltage operating level of the DC electrical network 16, e.g. as determined by a higher level controller, and the actual measured DC voltage $V_{dc\_meas}$, in the DC electrical network 16. In this manner the DC voltage control portion 46 is chosen to operate when the voltage source converter 10 is configured to transfer energy from the AC electrical network 14 to the DC electrical network 16, i.e. when the voltage source converter 10 is operating as a rectifier.

Meanwhile, the DC power control portion 47 outputs an amount of active power $P_{ref}$ to be exchanged based on a DC power demand $P_{dc\_demand}$, i.e. a DC power level of the DC electrical network 16, e.g. as determined by a higher level controller, and each of the actual measured DC voltage $V_{dc\_meas}$ and the actual measured DC current $I_{dc\_meas}$ in the DC electrical network 16. In this manner the DC power control portion 47 is chosen to operate when the voltage source converter 10 is configured to transfer energy from the DC electrical network 16 to the AC electrical network 14, i.e. when the voltage source converter 10 is operating as an inverter.

The active power control block 40 also includes a fault detection section 48 which is configured to modify the output $P_{ref}$ of the power control section 44 in the event of the actual currents $I_a$, $I_b$, $I_c$ flowing in the single-phase limbs 28 becoming unbalanced. Such an imbalance in the individual limb currents $I_a$, $I_b$, $I_c$ arises as a result of an imbalance in the phase voltage $V_a$, $V_b$, $V_c$ of each phase a, b, c of the AC electrical network 14.

In the embodiment shown, the fault detection section 48 includes a voltage level fault detector 50 which is configured to detect a reduction in the AC voltage of the AC electrical network 14 and thereafter temporarily reduce the amount of active power $P_{ref}$ that the voltage source converter 10 exchanges with the AC electrical network 14.

Such a reduction in the AC voltage might arise if the voltage in a single phase a, b, c dips, or if there is an increase in the impedance 18 of the AC electrical network 14 because, e.g. a generator supplying the AC electrical network 14 is switched off. In such circumstances, when the AC voltage within the AC electrical network 14 reduces, the current flowing in the AC electrical network 14 will increase (possibly dangerously so) if the active power $P_{ref}$ delivered by the AC electrical network 14 remains the same.

The voltage level fault detector 50 provides a first modified active power amount $P^*_{VL}$ which acts to reduce the amount of active power $P_{ref}$ the voltage source converter 10 exchanges with the AC electrical network 14. This first modified amount $P^*_{VL}$ is based on a nominal amount of reactive power $Q_{nominal}$ to be exchanged with the AC electrical network 14, a peak current $I_{peak}$, and the magnitude of a positive voltage sequence component $V^p_{\alpha\beta}$ which is representative of the AC voltage level in the AC electrical network 14, and is described in more detail below.

Each of the nominal amount of reactive power $Q_{nominal}$ and the peak current $I_{peak}$ are provided as constant values that are established according to the particular design and configuration of the voltage source converter 10. $I_{peak}$ is the peak of the rated current value that the voltage source converter 10 is designed to accommodate, and $Q_{nominal}$ is selected to reduce the amount of active power $P_{ref}$ exchanged to a level whereby the currents $I_a$, $I_b$, $I_c$ flowing through the voltage source converter 10 do not exceed $I_{peak}$.

More particularly the first modified active power amount $P^*_{VL}$ is derived by way of the following calculation:

$$P^*_{VL} = \sqrt{\frac{9}{4} \cdot |V^p_{\alpha\beta}|^2 \cdot I^2_{peak} - Q^2_{nominal}}$$

The fault detection section 48 also includes a single phase fault detector 52 that is configured to detect a fault to ground in a single phase a, b, c of the AC electrical network 14 and thereafter temporarily reduce the amount of active power $P_{ref}$ that the voltage source converter 10 exchanges with the AC electrical network 14.

The single phase fault detector 52 provides a second modified active power amount $P^*_{SPF}$ which acts to reduce the amount of active power $P_{ref}$ the voltage source converter 10 exchanges with the AC electrical network 14. This second modified amount $P^*_{SPF}$ is assigned based on a consideration of the peak current $I_{peak}$ that each single phase limb 28 is designed to accommodate, and might typically be between 0.5 and 0.66 of the power rating of the voltage source converter 10.

In addition to the foregoing, the fault detection section 48 also includes a multi-phase fault detector 54 that is configured to detect a fault to ground in each phase a, b, c of the AC electrical network 14 and thereafter temporarily reduce to zero the amount of active power $P_{ref}$ that the voltage source converter 10 exchanges with the AC electrical network 14.

In the embodiment shown, the multi-phase fault detector 54 is a three phase fault detector which provides a third modified active power amount $P^*_{TPF}$ which acts to reduce the amount of active power $P_{ref}$ the voltage source converter 10 exchanges with the AC electrical network 14. This third modified amount $P^*_{TPF}$ is, as indicated above, zero.

In other embodiments of the invention (not shown) the fault detection section 48 may additionally or alternatively include other fault detectors, such as a two-phase fault detector which is configured to detect a fault to ground in two out of three phases a, b, c of the AC electrical network 14. Still further such fault detectors may include a frequency fault detector which is configured to detect a disturbance in the AC electrical network 14, and to provide a modified active power amount $P^*_F$ which acts to reduce any deviation in the frequency from its normal operating range. Another such other fault detector is a weak AC system detector which is configured to consider an AC source impedance or an AC phase angle, and to provide a modified active power amount $P^*_W$ which acts to alter the calculated active power amount $P_{ref}$ accordingly.

In each such additional embodiment, however, the fault detection section 48 continues to be configured to modify the output active power $P_{ref}$ of the power control section 44 in the event of the currents $I_a$, $I_b$, $I_c$ flowing in the single phase limbs 28 becoming unbalanced, i.e. in the event of the corresponding phase voltages $V_a$, $V_b$, $V_c$ becoming unbalanced.

In the foregoing manner each of the respective fault detectors 50, 52, 54 described above is able to alter the amount of active power $P_{ref}$ that the voltage source converter 10 actually exchanges with the AC electrical network 14. In other embodiments of the invention the power control section 44 may include only a selected one or two of the fault detectors described above, as well as or instead of still further fault detectors not described herein.

The fault detection section 48 still further includes a manipulation module 56 that is operable at a first short time constant and a second long time constant.

In the embodiment shown, the manipulation module 56 takes the form of a first order filter, although other types of manipulation module are also possible. The manipulation module 56 alters the operation of the fault detection section 48 whereby any reduction in the amount of active power $P_{ref}$ that the voltage source converter 10 exchanges with the AC electrical network 14 takes place at the first time constant, i.e. quickly, and any subsequent increase in the amount of active power $P_{ref}$ that the voltage source converter 10 exchanges with the AC electrical network takes place at the second long time constant, i.e. more slowly.

In other embodiments of the invention, the first and second time constants may be configurable during operation of the voltage source converter 10 such that under some operational conditions both time constants are short, both are long, or any combination thereof. In this manner the manipulation module 56 can operate to alter the rate at which the amount of active power $P_{ref}$ is determined.

Each of the voltage level, single phase and multi-phase fault detectors 50, 52, 54 passes its output to the manipulation module 56 via a first minimum block 58.

Meanwhile the output of the manipulation module 56 is combined with the output $P_{ref}$ of the power control section 44 via a second minimum block 60 in order to reduce the level of $P_{ref}$.

Each of the minimum blocks 58, 60 functions in a conventional manner to select the minimum input provided thereto and pass this through to the output thereof. For example, in the case of each of the multi-phase fault detectors 50, 52, 54 providing respective inputs to the corresponding minimum block 58 of 1 per unit power (pu), 0.7 pu, and 1 pu, the minimum block 58 will pass the minimum input, i.e. 0.7 pu through to its output.

Returning to the first control block 38 as a whole, the reactive power control block 42 included therein has a selectively operable AC voltage control portion 62 and a selectively operable fault control portion 64.

The AC voltage control portion 62 operates when the actual currents $I_a$, $I_b$, $I_c$ flowing in the single-phase limbs 28 are balanced, i.e. during normal operation of the voltage source converter 10 when the phase voltages $V_a$, $V_b$, $V_c$ are balanced, and when so operating the AC voltage control portion 62 outputs an amount of reactive power $Q_{ref}$ that the voltage source converter 10 should exchange with the AC electrical network 14. This reactive power amount $Q_{ref}$ is based on an AC voltage demand $V_{ac\_demand}$, i.e. an AC voltage operating level of the AC electrical network 14, e.g. as measured at the point of common coupling 22, and the magnitude of the positive voltage sequence component $V^P{}_{\alpha\beta}$ first mentioned above.

More particularly, in the embodiment shown the AC voltage control portion 62 determines the reactive power amount $Q_{ref}$ by controlling the magnitude of the positive voltage sequence component $V^P{}_{\alpha\beta}$ to follow the magnitude of the AC voltage demand $V_{ac\_demand}$. In other embodiments of the invention, however, the AC voltage control portion 62 may determine the reactive power amount $Q_{ref}$ in a different manner.

In the meantime, the fault control portion 64 operates when the actual currents $I_a$, $I_b$, $I_c$ flowing in the single-phase limbs 28 are unbalanced, i.e. during a fault condition when the phase voltages $V_a$, $V_b$, $V_c$ are unbalanced. When so operating the fault control portion 64 sets the amount of reactive power $Q_{ref}$ to the nominal amount of reactive power $Q_{nominal}$. In other embodiments of the invention the fault control portion 64 may set the amount of reactive power $Q_{ref}$ to below the nominal amount of reactive power $Q_{nominal}$.

Following clearance of the fault condition the AC voltage control portion 62 resumes the determination of the reactive power amount $Q_{ref}$.

As well as the foregoing, the controller 36 includes a second control block 66 which incorporates a current reference generator 68 that establishes the respective phase current reference $I_{refA}$, $I_{refB}$, $I_{refC}$ for each single-phase limb 28 based on the amounts of active and reactive power $P_{ref}$, $Q_{ref}$ determined by the first control block 38.

The current reference generator 68 additionally establishes the respective phase current references $I_{refA}$, $I_{refB}$, $I_{refC}$ by using an instantaneous active and reactive power calculation method based on positive and negative voltage sequence components $V^P{}_{\alpha\beta}$, $V''{}_{\alpha\beta}$ within a stationary $\alpha$-$\beta$ reference frame.

The positive and negative voltage sequence components $V^P{}_{\alpha\beta}$, $V''{}_{\alpha\beta}$ are derived from the actual, i.e. as measured at the point of common coupling 22, phase voltage $V_a$, $V_b$, $V_c$ of each phase a, b, c of the AC electrical network 14. In this regard it is noted that an unbalanced three phase voltage system without a zero sequence (i.e. absent a fourth transmission line) can be represented as the sum of positive and negative sequence components, and a vector $\overline{V}_{\alpha\beta}$ representing the three measured phase voltages $V_a$, $V_b$, $V_c$ can therefore be expressed as:

$$\overline{V}_{\alpha\beta}=\overline{V}_{\alpha\beta}{}^P+\overline{V}_{\alpha\beta}{}^n$$

where $\overline{V}_{\alpha\beta}{}^P$ and $\overline{V}_{\alpha\beta}{}^n$ are vectors representing the positive and negative sequence components of the three measured phase voltages $V_a$, $V_b$, $V_c$ in a stationary $\alpha$-$\beta$ reference frame.

The current reference generator 68 additionally makes use of the ability to express a vector $\overline{I}_{\alpha\beta}$ representing the three actual phase currents, i.e. the actual measured current $I_a$, $I_b$, $I_c$ flowing in each of the single-phase limbs 28, as:

$$\overline{I}_{\alpha\beta}=\overline{I}_{\alpha\beta}{}^P+\overline{I}_{\alpha\beta}{}^n$$

where $\overline{I}_{\alpha\beta}{}^P$, and $\overline{I}_{\alpha\beta}{}^n$ are vectors representing the positive and negative sequence components of the three measured phase currents $I_a$, $I_b$, $I_c$ in a stationary $\alpha$-$\beta$ reference frame.

Following on from the above, the complex power S at the point of common coupling 22 is:

$$S=(3/2)\cdot\overline{V}_{\alpha\beta}\cdot\overline{I}^*{}_{\alpha\beta}$$

where the superscript "*" designates the complex conjugate.

Expanding the foregoing equation and rearranging the resulting real part Re(S) (which represents active power) and the resulting imaginary part Im(S) (which represents reactive power), gives:

$$Re(S)=P_{in}=\overline{P}_{in}+\tilde{P}_{in}$$

$$Im(S)=Q_{in}=\overline{Q}_{in}+\tilde{Q}_{in}$$

with $P_{in}$ representing the total (i.e. across all three phases a, b, c) energy flow per time unit in the power transmission network 12; and $Q_{in}$ giving the magnitude of the corresponding reactive power in each of the three phases a, b, c, and where:

$\overline{P}_{in}$ is the average part of $P_{in}$ which represents the energy flowing per time unit in one direction only;

$\tilde{P}_{in}$ is the oscillating part of $P_{in}$ which represents the oscillating energy flow per time unit (which produces a zero average value and thus represents an amount of additional active power flow in the network 12 that makes no effective contribution to the energy transfer between the AC and DC networks 14, 16);

$\overline{Q}_{in}$ is the average part of $Q_{in}$ which corresponds to conventional three-phase reactive power and does not contribute to the energy transfer between the AC and DC networks 14, 16; and $\tilde{Q}_{in}$ is the oscillating part of $Q_{in}$ which corresponds also to a reactive power that is being exchanged among the three phases a, b, c, without transferring any energy between AC and DC networks 14, 16.

In an unbalanced, i.e. fault, operating condition, both of the oscillating parts $\tilde{P}_{in}$, $\tilde{Q}_{in}$ mentioned above are related to the presence of a negative sequence component and so are undesirable, especially in a weak AC electrical network 14 such as that in the present embodiment.

The average parts $\overline{P}_{in}$, $\overline{Q}_{in}$ can be calculated in a stationary $\alpha$-$\beta$ frame as follows:

$$\overline{P}_{in}=(3/2)*(V_\alpha{}^P\cdot I_\alpha{}^P+V_\beta{}^P\cdot I_\beta{}^P+V_\alpha{}^n\cdot I_\alpha{}^n+V_\beta{}^n\cdot I_\beta{}^n)$$
$$\overline{Q}_{in}=(3/2)*(V_\beta{}^P\cdot I_\alpha{}^P-V_\alpha{}^P\cdot I_\beta{}^P-V_\beta{}^n\cdot I_\alpha{}^n+V_\alpha{}^n\cdot I_\beta{}^n)$$

For a weak AC electrical network 14 (and also as it happens if operating in conjunction with a strong AC electrical network 14), the current reference generator 68 is arranged to avoid ripple in the active power at either the point of common coupling 22 or at the AC side 34 of each phase element, i.e. by making $\tilde{P}_{in}=0$. This is achieved by optimising the currents $I_\alpha^*$ and $I_\beta^*$ in order to obtain $\tilde{P}_{in}=0$.

In addition, when operating under unbalanced conditions the current reference generator 68 is arranged to optimise the currents $I_\alpha^*$ and $I_\beta^*$ in order to reduce the actual active power required by the DC electrical network 16. This is to allow the AC electrical network 14 to settle down once the fault giving rise to the unbalanced operating conditions has cleared.

To meet the aforementioned requirement, the current reference generator 68 satisfies four constraints, each represented by a linear equation which has positive and negative sequence components within a stationary α-β reference frame, and set out as follows:

$$\overline{P}_{in}=P_{ref}=P_{dc\_demand}=P_{loss}=(3/2)*(V_\alpha^P \cdot I_\alpha^P + V_\beta^P \cdot I_\beta^P + V_\alpha^n \cdot I_\alpha^n + V_\beta^n \cdot I_\beta^n)$$

where $P_{loss}$ is the active power loss;

$$\overline{Q}_{in}=Q_{ref}=(3/2)*(V_\beta^P \cdot I_\alpha^P - V_\alpha^P \cdot I_\beta^P - V_\beta^n \cdot I_\alpha^n + V_\alpha^n \cdot I_\beta^n);$$

$$V_\alpha^n \cdot I_\alpha^P + V_\beta^n \cdot I_\beta^P + V_\alpha^P \cdot I_\alpha^n + V_\beta^P \cdot I_\beta^n = 0; \text{ and}$$

$$V_\beta^n \cdot I_\alpha^P - V_\alpha^n \cdot I_\beta^P - V_\beta^P \cdot I_\alpha^n + V_\alpha^P \cdot I_\beta^n = 0$$

The current reference generator 68 is therefore configured to establish the phase current references $I_{refA}$, $I_{refB}$, $I_{refC}$ according to:

$$\begin{bmatrix} I_\alpha^{p*} \\ I_\beta^{p*} \\ I_\alpha^{n*} \\ I_\beta^{n*} \end{bmatrix} = \frac{2}{3} \cdot \begin{bmatrix} V_\alpha^p & V_\beta^p & V_\alpha^n & V_\beta^n \\ V_\beta^p & -V_\alpha^p & -V_\beta^n & V_\alpha^n \\ V_\alpha^n & V_\beta^n & V_\alpha^p & V_\beta^p \\ V_\beta^n & -V_\alpha^n & -V_\beta^p & V_\alpha^p \end{bmatrix}^{-1} \cdot \begin{bmatrix} P_{ref} \\ Q_{ref} \\ 0 \\ 0 \end{bmatrix}; \text{ and}$$

$$\overline{I}_{\alpha\beta}^* = \overline{I}_{\alpha\beta}^{p*} + \overline{I}_{\alpha\beta}^{n*},$$

i.e. $I_\alpha^* = I_\alpha^{p*} + I_\alpha^{n*}$ and $I_\beta^* = I_\beta^{p*} + I_\beta^{n*}$ where the phase current references $I_{refA}$, $I_{refB}$, $I_{refC}$ are obtained from $I^*_\alpha$ and $I^*_\beta$ above by using the inverse of a Clark transformation.

Such a current reference generator 68, configured as set out above, functions during both balanced, i.e. non-fault, conditions and unbalanced, i.e. fault, conditions. For example, when functioning during balanced conditions the negative voltage sequence component is equal to zero which, in turn, results in the negative voltage sequence component also equalling zero.

Meanwhile, when functioning during unbalanced conditions the current reference generator 68 will calculate the complex conjugate positive and negative current sequence components $I_\alpha^{P*}$, $I_\beta^{P*}$, $I_\alpha^{n*}$, $I_\beta^{n*}$ by satisfying the four constraints set out above, and thereby in turn be able to establish each of the phase current references $I_{refA}$, $I_{refB}$, $I_{refC}$.

The second control block 66 also includes a transformation module 70 which is configured to transform components within a stationary α-β reference frame, i.e. $I^*_\alpha$ and $I^*_\beta$ into individual phase components, i.e. $I_{refA}$, $I_{refB}$, $I_{refC}$. More particularly, the transformation module 70 carries out the inverse Clark transformation mentioned above.

In addition, the second control block 66 further includes a current limiter module 72 which is configured to limit the maximum value of each phase current reference $I_{refA}$, $I_{refB}$, $I_{refC}$ that the current reference generator 68 is able to establish. In an embodiment, the maximum value is chosen to not exceed the maximum peak current $I_{max}$ that each single phase 28 is designed to accommodate.

The controller 36 still further includes a third control block 74 which has three phase controls 76A, 76B, 76C, each of which corresponds to a respective phase a, b, c of the AC electrical network 14.

Each of the phase controls 76A, 76B, 76C is configured to generate an AC voltage demand $V_{comA}$, $V_{comB}$, $V_{comC}$ that the corresponding single-phase limb 28 is required to provide in order that the current $I_a$, $I_b$, $I_c$ of flowing in the corresponding single-phase limb 28 tracks the established phase current reference $I_{refA}$, $I_{refB}$, $I_{refC}$. Each phase control 76A, 76B, 76C utilises a Discrete time Sliding Mode Control (DSMC) control algorithm, although other control algorithms may also be used.

The controller 36 also additionally includes a positive and negative sequence generator 78 which derives, from the actual phase voltage $V_a$, $V_b$, $V_c$ of each phase a, b, c of the AC electrical network 14 (i.e. each phase voltage $V_a$, $V_b$, $V_c$ as measured at the point of common coupling 22), the positive and negative voltage sequence components $V^p_{\alpha\beta}$, $V^n_{\alpha\beta}$ within a stationary α-β reference frame that are used by the first and second control blocks 38, 66. In the embodiment shown the positive and negative sequence generator 78 utilises a positive/negative sequence component extraction method, although other methods may also be used.

An example of the voltage source converter 10 in use, during a fault condition in the form of a fault to ground in a single phase a, is illustrated schematically in FIGS. 5A to 5E.

Figure 5A:
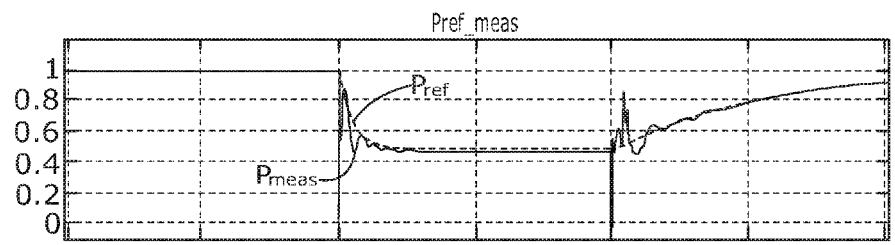
FIGS. 5A, 5B, 5C, 5D, and 5E illustrate schematically one example of the voltage source converter shown in FIG. 1 in use during a fault condition.
Figure 5B:
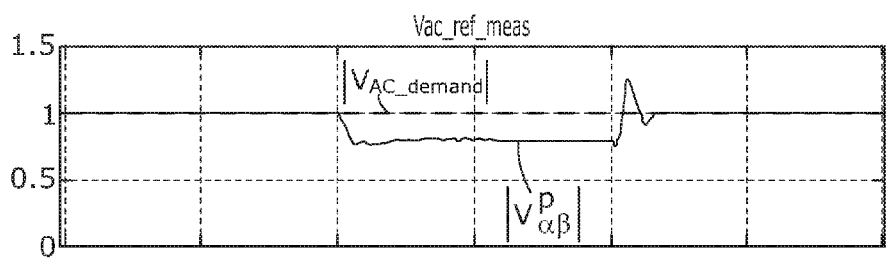
Figure 5C:
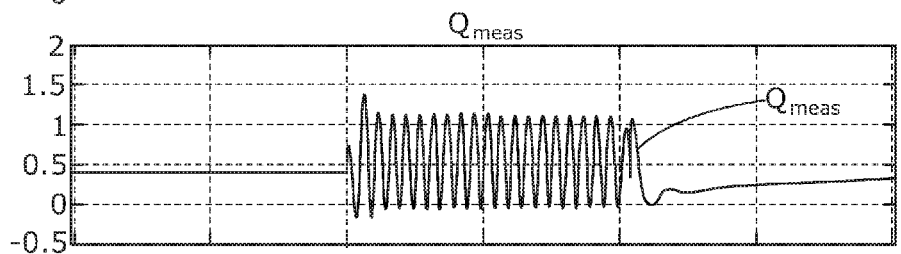
Figure 5D:
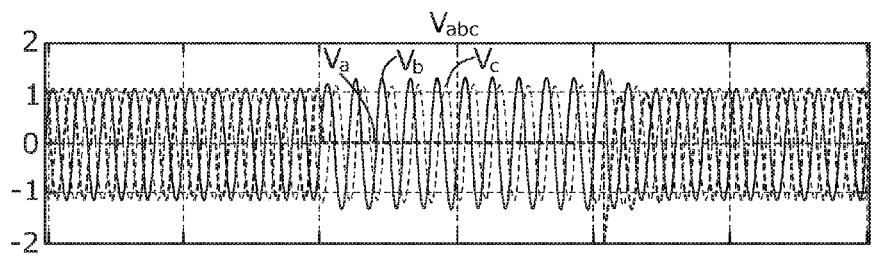

More particularly, FIG. 5D shows a fault to ground in phase a between 0.8 and 1 seconds.

Upon initiation of the fault, i.e. at 0.8 seconds, the voltage source converter 10, and more particularly the controller 36 thereof, reacts by reducing the amount of active power $P_{ref}$ that it determines should be exchanged with the AC electrical network 14, thereby resulting in the actual amount of active power $P_{meas}$ exchanged with the AC electrical network 14 reducing as shown in FIG. 5A.

At the same time the reactive power $Q_{ref}$ is controlled independently of the active power $P_{ref}$ as illustrated by the actual measured reactive power $Q_{meas}$ shown in FIG. 5C, and more particularly is set to $Q_{nominal}$, e.g. approximately 0.4 per unit reactive power, by the fault control portion 64 of the reactive power control block 42. In this way energy is still transferred between the AC and DC electrical networks 14, 16 as evidenced by the actual active power $P_{meas}$ exchange shown in FIG. 5A.

Figure 5E:
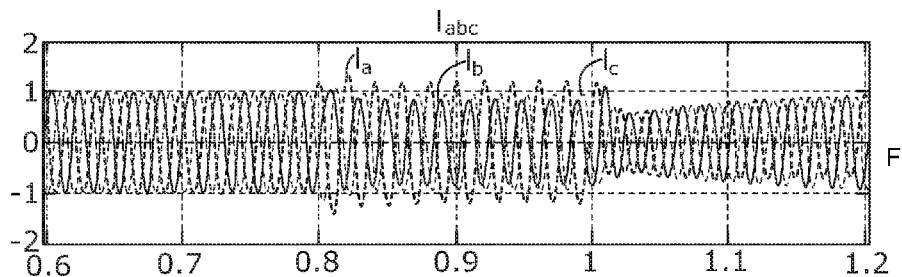

Furthermore, the controller 36 successfully limits any spike in the actual currents $I_a$, $I_b$, $I_c$ flowing in the single-phase limbs 28 to a maximum in the case of $I_a$ of 1.4 times its normal operating level, as shown in FIG. 5E, although other maximum current levels may also be chosen.

For completeness, FIG. 5B shows the magnitude of the AC voltage demand $V_{AC\_demand}$ and the magnitude of the positive voltage sequence component $V^p_{\alpha\beta}$ which would ordinarily be used to determine the amount of reactive power $Q_{ref}$ to be exchanged during operation of the voltage source converter under normal, i.e. non-fault, conditions.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A voltage source converter comprising:
   first and second DC terminals for connection to a DC electrical network;
   a plurality of single-phase limbs, each single-phase limb including a phase element, each phase element including at least one switching element configured to interconnect a DC voltage and an AC voltage, an AC side of each phase element being connectable to a respective phase of a multi-phase AC electrical network, each single-phase limb being connected between the first and second DC terminals; and
   a controller configured to determine independently of one another an amount of active power that the voltage source converter should exchange with the AC electrical network and an amount of reactive power that the voltage source converter should exchange with the AC electrical network, the controller being further configured to establish a respective phase current reference for each single-phase limb which is independent of each other respective phase current reference, the respective phase current reference for each single-phase limb defining the current each single-phase limb is required to draw from or pass to a corresponding phase of the AC electrical network to effect the determined active power and reactive power exchanges with the AC electrical network;
   wherein the controller includes a first control block comprising an active power control block to determine the amount of active power to be exchanged with the AC electrical network, and a reactive power control block to determine the amount of reactive power to be exchanged with the AC electrical network;
   wherein the active power control block includes:
      a power control section which outputs the amount of active power to be exchanged, the power control section including a selectively operable DC voltage control portion and a selectively operable DC power control portion, the DC voltage control portion operating when the voltage source converter is configured to transfer energy from the AC electrical network to the DC electrical network and the DC power control operating when the voltage source converter is configured to transfer energy from the DC electrical network to the AC electrical network; and
      a fault detection section configured to modify the output of the power control section in the event of the currents flowing in the single-phase limbs becoming unbalanced in order to alter the amount of active power that the voltage source converter exchanges with the AC electrical network.

2. The voltage source converter according to claim 1, wherein the fault detection section includes a voltage level fault detector configured to detect a decrease in the AC voltage of the AC electrical network and thereafter temporarily reduce the amount of active power that the voltage source converter exchanges with the AC electrical network.

3. The voltage source converter according to claim 1, wherein the fault detection section includes a single phase fault detector configured to detect a fault to ground in a single phase of the AC electrical network and thereafter temporarily reduce the amount of active power that the voltage source converter exchanges with the AC electrical network.

4. The voltage source converter according to claim 1, wherein the fault detection section includes a multi-phase fault detector configured to detect a fault to ground in each phase of the AC electrical network and thereafter temporarily reduce to zero the amount of active power that the voltage source converter exchanges with the AC electrical network.

5. The voltage source converter according to claim 1, wherein the fault detection section includes a manipulation module operable at a first time constant and a second time constant, the manipulation module altering the operation of the fault detection section whereby any reduction in the amount of active power that the voltage source converter exchanges with the AC electrical network takes place at the first time constant and any subsequent increase in the amount of active power that the voltage source converter exchanges with the AC electrical network takes place at the second time constant.

6. The voltage source converter according to claim 5, wherein the first and second time constants differ from one another.

7. The voltage source converter according to claim 1, wherein the reactive power control block includes a selectively operable AC voltage control portion and a selectively operable fault control portion, the AC voltage control portion operating when the currents flowing in the single-phase limbs are balanced, and the fault control portion operating when the currents flowing in the single-phase limbs are unbalanced.

8. The voltage source converter according to claim 1, wherein the controller includes a second control block which has a current reference generator that establishes the respective phase current reference for each single-phase limb based on the amounts of active and reactive power determined by the first control block.

9. The voltage source converter according to claim 8, wherein the current reference generator further establishes the respective phase current reference for each single-phase limb based on positive and negative voltage sequence components within a stationary α-β reference frame, the positive and negative voltage sequence components being derived from an actual phase voltage of each phase of the AC electrical network.

10. The voltage source converter according to claim 8, wherein the second control block also includes a transformation module configured to transform components within a stationary α-β reference frame to individual phase components.

11. The voltage source converter according to claim 8, wherein the second control block also includes a current limiter module configured to limit the maximum value of each phase current reference the current reference generator is able to establish.

12. The voltage source converter according to claim 8, wherein the controller includes a third control block which has a plurality of phase controls, each of which corresponds to a respective phase of the AC electrical network, and each of which is configured to generate an AC voltage demand that the corresponding single-phase limb is required to provide in order that the current flowing in the corresponding single-phase limb tracks the established phase current reference.

13. The voltage source converter according to claim 1, wherein the controller includes a positive and negative sequence generator to derive positive and negative voltage sequence components within a stationary α-β reference frame from the actual phase voltage of each phase of the AC electrical network.

14. The voltage source converter according to claim 2, wherein the fault detection section includes a single phase fault detector configured to detect a fault to ground in a single phase of the AC electrical network and thereafter temporarily reduce the amount of active power that the voltage source converter exchanges with the AC electrical network.

15. The voltage source converter according to claim 2, wherein the fault detection section includes a multi-phase fault detector configured to detect a fault to ground in each phase of the AC electrical network and thereafter temporarily reduce to zero the amount of active power that the voltage source converter exchanges with the AC electrical network.

16. The voltage source converter according to claim 2, wherein the fault detection section includes a manipulation module operable at a first time constant and a second time constant, the manipulation module altering the operation of the fault detection section whereby any reduction in the amount of active power that the voltage source converter exchanges with the AC electrical network takes place at the first time constant and any subsequent increase in the amount of active power that the voltage source converter exchanges with the AC electrical network takes place at the second time constant.

17. The voltage source converter according to claim 9, wherein the second control block also includes a transformation module configured to transform components within a stationary α-β reference frame to individual phase components.

* * * * *